Nov. 12, 1957 G. V. JORDAN ET AL 2,812,762

OXYGEN HUMIDIFYING

Filed Dec. 2, 1953

INVENTOR
GEORGE V. JORDAN
HERBERT L. FLACK
BY THOMAS A. MANZELLI

ATTORNEY.

United States Patent Office 2,812,762
Patented Nov. 12, 1957

2,812,762

OXYGEN HUMIDIFYING

George Vincent Jordan, Philadelphia, Herbert L. Flack, Rosemont, and Thomas A. Manzelli, Philadelphia, Pa., assignors to Selas Corporation of America, Dresher, Pa., a corporation of Pennsylvania Application December 2, 1953, Serial No. 395,666

8 Claims. (Cl. 128—191)

The present invention relates to the humidification of gases, and more particularly to the humidification of oxygen for use in oxygen tents or masks for therapeutic purposes.

It is desirable to increase the humidity of oxygen or other gases supplied to a patient in a hospital to as near saturation as possible. At the present time, this is generally accomplished by allowing the oxygen to bubble through water, or to supply the oxygen in the form of an atomized water-oxygen mixture. The first of these methods is unsatisfactory because the necessary percentage of relative humidity is not obtainable. The second method is unsatisfactory since it produces rather large droplets of water in the spray which condense to wet the surroundings.

It is an object of the invention to provide a method of and apparatus for humidifying oxygen or other gases for therapeutic use. It is a further object of the invention to produce an oxygen atmosphere of high humidity for use in oxygen tents and like apparatus. Another object of the invention is to provide a method and apparatus which may be used to control the moisture content of a gaseous atmosphere used for therapeutic purposes.

In practicing the present invention, there is provided a rigid porous membrane having extremely fine pores. This membrane is continuously wetted by water that is carried by capillary action into the pores thereof. The oxygen or other gas to be humidified is passed through the membrane under pressure, and on its way through displaces the water in the pores thereof as a mist that is so fine that it is almost invisible. This mist readily vaporizes upon expansion of the gas. The oxygen-water vapor mixture is either passed directly to the point of use, or is entrained with air that is being circulated through an oxygen tent, for example.

While the present invention is particularly adapted for use in humidifying oxygen, and will be so described by way of example, it will be apparent that it can be used for the humidification of other gases.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

Figure 1:
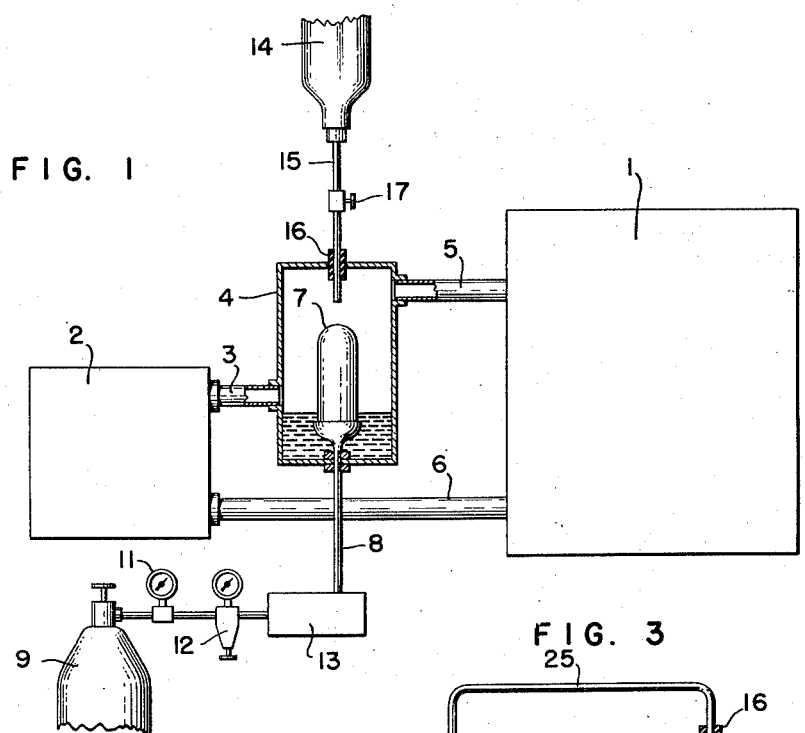
Figure 1 is a view showing diagrammatically the present invention used in connection with an oxygen tent.

Referring first to Figure 1, there is shown diagrammatically at 1 an oxygen tent to be placed around a hospital bed. This tent is supplied with air from a refrigerating unit 2 through a conduit 3, a chamber 4 and a second conduit 5. Generally, the air is recirculated between the refrigerating unit and the tent by means of a return conduit 6 extending directly between these two parts. Oxygen is introduced into the refrigerated air passing to the tent in chamber 4 by forcing it through a hollow, porous candle 7 that is located in said chamber. The interior of candle 7 is connected by a suitable tube 8 with a bottle 9 forming the supply of oxygen. Located in the oxygen line is the normal pressure gauge 11 to indicate the pressure at which oxygen is released from the bottle and an auxiliary pressure regulator and gauge 12 which is used to make an accurate adjustment of the oxygen supplied to the candle 7. If desired, a heater 13 can be placed in the oxygen line in order to raise the temperature thereof so that the oxygen will be able to increase its ability to carry moisture.

Moisture in the form of water is supplied to the candle from a bottle 14 through a tube 15 which extends into the chamber 4 and directly above the upper end of the candle 7. A suitable stopper 16 is provided to make the connection between the tube 15 and the chamber air tight and a valve 17 is used in order to regulate the flow of water.

In some cases, it is desirable to supply pure oxygen to a patient through a nasal tube rather than the diluted oxygen through a tent. When this is done, a chamber such as is shown at 18 in Figure 2 of the drawing is inserted in the oxygen line, and is adapted to receive the candle 7. An outlet tube 19, to be connected to the nasal tube for the patient, extends from the chamber. This tube can be of any desired length. If desired, the chamber 18 can be provided with a mask or other fitting so that a patient can breathe directly from the chamber and thereby inhale what may be called a supersaturated atmosphere. The supply of oxygen and the supply of water in this case is the same as that shown in connection with Figure 1. A heater similar to the heater 13 may be used if desired.

Figure 2:
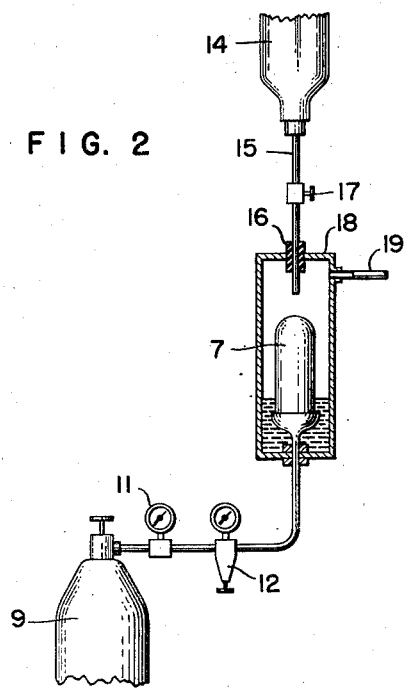
Figure 2 is a diagrammatic view showing the use of the invention in supplying pure oxygen.
Figure 3:
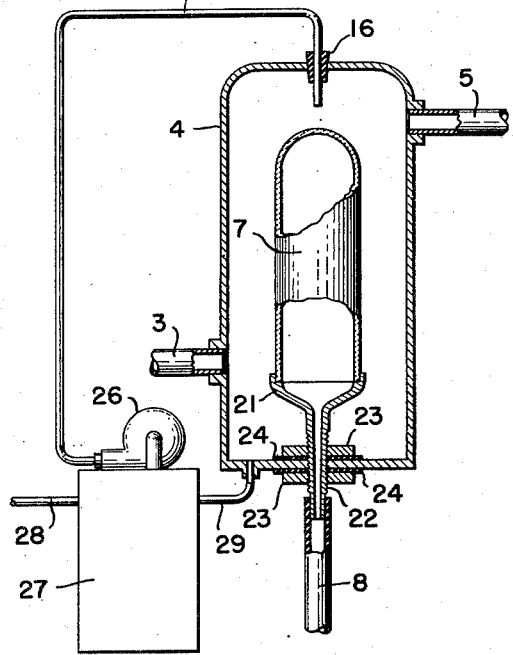
Figure 3 is an enlarged sectional view showing the manner in which the membrane is connected to the oxygen supply, and a different way of wetting the membrane.

The construction of the candle and the manner in which it is mounted in the chamber 4 or 18 is shown more clearly in Figure 3. In this figure, it is seen that the candle comprises a hollow cylinder which is closed at one end and open at the other. The candle is preferably made of microporous porcelain having the largest pores thereof approximately 25 microns in diameter, although other materials and shapes may be used as long as the material is hydrophyllic and the pores are small enough. The open end of the candle is cemented to a suitable base 21 which has a threaded stem 22 projecting axially therefrom. This stem extends through an opening provided in the bottom chamber 4 and is held rigidly in place in the chamber by means of nuts 23 and washers 24 on opposite sides of the bottom wall of the chamber. The lower end of the stem 22 is connected by the tube 8 which may be of a material such as rubber or plastic, to the oxygen bottle, the tube passing through heater 13 on the way. The surface area of the candle will vary with the amount of oxygen that is to be supplied. When oxygen is to be supplied to a tent as in Figure 1, the candle can have an area of approximately 0.5 sq. ft., while with a device of the type shown in Figure 2, the candle can have approximately one-tenth of the area of that used with a tent.

There is shown in Figure 3 a different means for wetting the porous candle from that previously described. In this case, water is continuously discharged on the upper end of the candle from a tube 25 that is connected at its other end to a discharge from a pump 26. The pump is supplied with water from a reservoir 27 that is connected with a water supply 28 and the bottom of chamber 4 by a drain 29. In either case, whether the candle is wetted by the apparatus shown in Figures 1 and 2 or that shown in Figure 3, the amount of humidity imparted to the gas depends upon the degree of saturation of the candle. As the gas to be humidified passes through the fine pores of the candle, it will pick up and carry with it extremely small droplets of water. Since gas will pass through all pores, the more pores that are full of water, or the wetter the candle, the more water that can be displaced by the gas and the higher the humidity that is produced.

In practice, it is desirable to have the chamber 4 constructed of some transparent material, or to be provided with a window. Thus, the condition of wetting of the candle can be observed and the valve 17 or pump 26 regulated accordingly.

In the operation of the system of Figure 1, for example, air is cooled by the refrigerating mechanism 2 and is blown through conduit 3, chamber 4 and conduit 5 into the oxygen tent 1. The air is ordinarily recirculated back through the refrigerating apparatus through conduit 6. As the air passes through chamber 4, it picks up and carries with it the moisture laden oxygen discharged through the candle 7. Ordinarily in the operation of the system, about 125 cubic feet of air will be circulated per minute, and the air will have a temperature of from 68° F. to 75° F.

During the operation of the system, water is continually supplied from bottle 14 through pipe 15 to be discharged upon the upper end of the candle 7. This water is carried by capillary action into all of the pores of the candle so that it is completely wetted. Ordinarily, the bottom of the chamber is kept filled with water to a point slightly above the upper end of base 21. Valve 17 or pump 26 is adjusted so that enough water is supplied to insure that the candle is kept wet at all times. The amount of water used will vary, of course, with the amount of oxygen being used and the desired humidity, but can readily be adjusted. Ordinarily, from 500 to 1000 cc. of distilled water will be used per day.

Oxygen is generally supplied to the tube 8 leading to candle 7 at a pressure up to 15 p. s. i. This pressure must be at least sufficient to move water from the pores of the candle in the form of extremely fine droplets that, at the surface of the candle, are almost invisible to the eye. As the gas expands upon reaching the chamber, the droplets are vaporized and completely disappear. Generally, about 7 or 8 liters of oxygen per minute are required.

In the operation of this system with atmospheric air at 70° F. and 35 percent relative humidity, the humidity was increased appreciably almost as soon as the oxygen supply was turned on. Within five minutes, the relative humidity in tent 1 was increased to 93 percent, and within fifteen minutes it was increased to 97 percent, at which point it remained substantially constant without any condensation.

Normally, oxygen will be supplied directly from bottle 9 to candle 7. In some cases, however, it may be desirable to heat the oxygen slightly by heater 13 in order to compensate for the cooling that takes place when the oxygen expands as it leaves the filter. The warmer oxygen can hold slightly more moisture. Whether or not heating of the oxygen will be required will depend upon the temperature of the circulated air and the ambient temperature. This can only be determined when the system is in operation.

The system of Figure 2 operates in the same manner as that of Figure 1 as far as the humidification of the oxygen is concerned. In this case, however, the oxygen is intended to be supplied directly through tube 19 to a nasal inhaler. Consequently, pure oxygen is supplied to the patient, rather than the oxygen that has been diluted by the air in the tent.

With either of the systems described above, oxygen that is substantially saturated is supplied under exactly controlled conditions for therapeutic uses. Furthermore, the moisture carried by the oxygen is in such form that condensation will not occur. In some uses of the apparatus where an oxygen enriched atmosphere is not required for the patient, compressed air or other gas can be supplied to the interior of the candle for humidification.

While in accordance with the provisions of the statutes, we have illustrated and described the best form of embodiment of our invention now known to us it will be apparent to those skilled in the art that changes may be made in the form of the apparatus disclosed without departing from the spirit and scope of the invention as set forth in the appended claims, and that in some cases certain features of our invention may be used to advantage without a corresponding use of other features.

What is claimed is:

1. In combination, an oxygen tent, air cooling mechanism, conduit means forming a connection through which a stream of air can flow from said mechanism to said tent, structure forming a chamber located in said conduit means, a porous membrane located in said chamber with one surface thereof shielded from the air flowing through said conduit, means to wet said membrane and fill the pores thereof with a liquid, and means to supply oxygen to said one surface of said membrane to pass through the same and carry moisture from the pores thereof into said stream of air.

2. The combination of claim 1 including means to heat the oxygen prior to the time it is supplied to said membrane.

3. In combination, structure forming a chamber, a microporous membrane element mounted across a portion of said chamber, means to wet one side of said membrane element with a liquid to fill the pores thereof with said liquid, means to supply a gas under pressure to the opposite side of said membrane element to pass therethrough and carry moisture from the pores thereof in the form of a mist, and means to pass a gas through said chamber in communication with the first mentioned side of said membrane element to carry the mist with it.

4. The combination of claim 3 in which said membrane element is in the shape of a hollow candle having one end closed and the other open, said opposite side of the membrane element comprising the interior of said candle, and means forming a gas conduit closing the open end of said candle and in communication with the interior thereof.

5. In combination, structure forming a chamber, a hollow, microporous membrane substantially cylindrical in shape and having one end open and one end closed, a hollow base having a tubular extension projecting from one end thereof attached to and closing the open end of said element, means to mount said base in said structure with said element in said chamber and a portion of said extension on the exterior thereof, tubular means extending into said chamber and so located that a liquid flowing therethrough will be directed against the surface of said element to be absorbed by the pores thereof, means to pass a first gas to be treated through said chamber around said element, and means to introduce a second treating gas through said extension into the interior of said element, the second gas passing through said element and carrying liquid from the pores thereof with it, said gas-liquid mixture leaving said chamber with said first gas.

6. In combination, an oxygen tent, means to supply air to said tent including a conduit through which the air flows, structure interposed between the ends of said conduit and forming a chamber, a porous candle, means to mount said candle in said chamber, tubular means extending in said chamber and directed toward said candle whereby liquid flowing through said means will wet said candle and fill the pores thereof, means to introduce oxygen into the interior of said candle to flow through said candle and carry liquid from the pores thereof with it, the air flowing through said conduit carrying the oxygen-liquid mixture with it to said tent.

7. The combination of claim 6 including means to adjust the flow of liquid, and means to adjust the flow of oxygen to the candle.

8. The combination of claim 7 including means to heat the oxygen prior to the time is it introduced into said candle.

References Cited in the file of this patent

UNITED STATES PATENTS

| 1,051,661 | Anderson | Jan. 28, 1913 |
| 1,589,749 | Fulweiler | June 22, 1926 |
| 2,190,613 | Sittler | Feb. 13, 1940 |
| 2,593,134 | Gibbon | Apr. 15, 1952 |

FOREIGN PATENTS

| 435,768 | Italy | May 22, 1948 |